United States Patent
Conover et al.

(10) Patent No.: US 10,504,191 B2
(45) Date of Patent: Dec. 10, 2019

(54) ENGAGEMENT-BASED SELECTION OF CONTENT FOR MEMBER SEGMENTS OF SOCIAL NETWORKS

(71) Applicant: LinkedIn Corporation, Mountain View, CA (US)

(72) Inventors: Michael Conover, San Francisco, CA (US); Timothy P. Jurka, Redwood City, CA (US); Claire D. McGinty, San Francisco, CA (US); Quinn Z. Shen, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 889 days.

(21) Appl. No.: 15/066,937

(22) Filed: Mar. 10, 2016

(65) Prior Publication Data
US 2017/0262762 A1   Sep. 14, 2017

(51) Int. Cl.
| | | |
|---|---|---|
| G06F 16/00 | (2019.01) | |
| G06Q 50/00 | (2012.01) | |
| G06F 16/9535 | (2019.01) | |
| G06F 16/335 | (2019.01) | |
| G06F 16/9536 | (2019.01) | |

(52) U.S. Cl.
CPC ........... *G06Q 50/01* (2013.01); *G06F 16/335* (2019.01); *G06F 16/9535* (2019.01); *G06F 16/9536* (2019.01)

(58) Field of Classification Search
CPC . G06F 16/335; G06F 16/9535; G06F 16/9536
See application file for complete search history.

(56) References Cited

U.S. PATENT DOCUMENTS

| | | | | |
|---|---|---|---|---|
| 2011/0258039 | A1* | 10/2011 | Patwa | G06Q 30/00 705/14.45 |
| 2013/0066876 | A1* | 3/2013 | Raskino | G06F 16/24575 707/741 |
| 2015/0095145 | A1 | 4/2015 | Shulman | |
| 2015/0269488 | A1* | 9/2015 | Galai | H04L 67/22 706/11 |
| 2015/0278877 | A1* | 10/2015 | Yi | G06Q 30/0275 705/14.71 |
| 2016/0275533 | A1* | 9/2016 | Smith | G06Q 30/0204 |
| 2017/0018008 | A1* | 1/2017 | Hajiyev | G06Q 30/0251 |
| 2017/0262532 | A1 | 9/2017 | Conover et al. | |

OTHER PUBLICATIONS

"Final Office Action Issued in U.S. Appl. No. 15/067,006", dated Dec. 14, 2018, 12 Pages.
"Non Final Office Action Issued in U.S. Appl. No. 15/067,006", dated Mar. 27, 2018, 14 Pages.

* cited by examiner

*Primary Examiner* — Alexander Khong
(74) *Attorney, Agent, or Firm* — Park, Vaughan, Fleming & Dowler LLP; Chia-Hsin Suen

(57) ABSTRACT

The disclosed embodiments provide a system for processing data. During operation, the system calculates one or more quantiles from a distribution of historic user engagement with content within a member segment of a social network. Next, the system performs a comparison of the one or more quantiles with a current measurement of user engagement with a content item within the member segment. When the comparison indicates that the current measurement of user engagement exceeds a threshold, the system presents the content item to one or more members in the member segment.

19 Claims, 8 Drawing Sheets

ENGAGEMENT-BASED SELECTION OF CONTENT FOR MEMBER SEGMENTS OF SOCIAL NETWORKS

RELATED APPLICATIONS

The subject matter of this application is related to the subject matter in a co-pending non-provisional application by the same inventors as the instant application and filed on the same day as the instant application, entitled "Generating Content Feeds Based on Expanded Network Engagement," having Ser. No. 15/067,006, and filing date Mar. 10, 2016.

The subject matter of this application is also related to the subject matter in a non-provisional application by inventors Timothy P. Jurka, Patrick Chase, Claire McGinty, Andrew Hatch, Alejandro Perez, Michael Conover, Sam Stokes, Gregory W. Bayer, Akshay Kothari and Ankit Gupta, entitled "Segment-Based Content Pools for Inclusion in Content Feeds," having Ser. No. 14/741,308, and filing date 16 Jun. 2015, which has issued as U.S. Pat. No. 10,042,897.

BACKGROUND

Field

The disclosed embodiments relate to filtering of digital content. More specifically, the disclosed embodiments relate to techniques for performing engagement-based selection of content for member segments of social networks.

Related Art

Content feeds such as RSS (Really Simple Syndication) feeds and Atom feeds are mechanisms for presenting content to interested people (e.g., users or subscribers) without requiring them to manually access or retrieve the content from one or more content sources. For example, a social network may generate a news feed of photos, audio, video, documents, articles, and/or other content items that are shared by members of the social network for each user accessing the social network. The user may then click on a posting of the content item within the news feed to navigate to a website on which the content item is hosted and access the entirety of the content item.

Moreover, the user experience with a content feed may be significantly impacted by the selection and ordering of content items in the content feed. For example, a provider of a content feed may risk user fatigue if a subscriber is presented with low-quality content items (e.g., spam), identical content items, content items that repeatedly cover the same subject, and/or content items that are not interesting or relevant to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
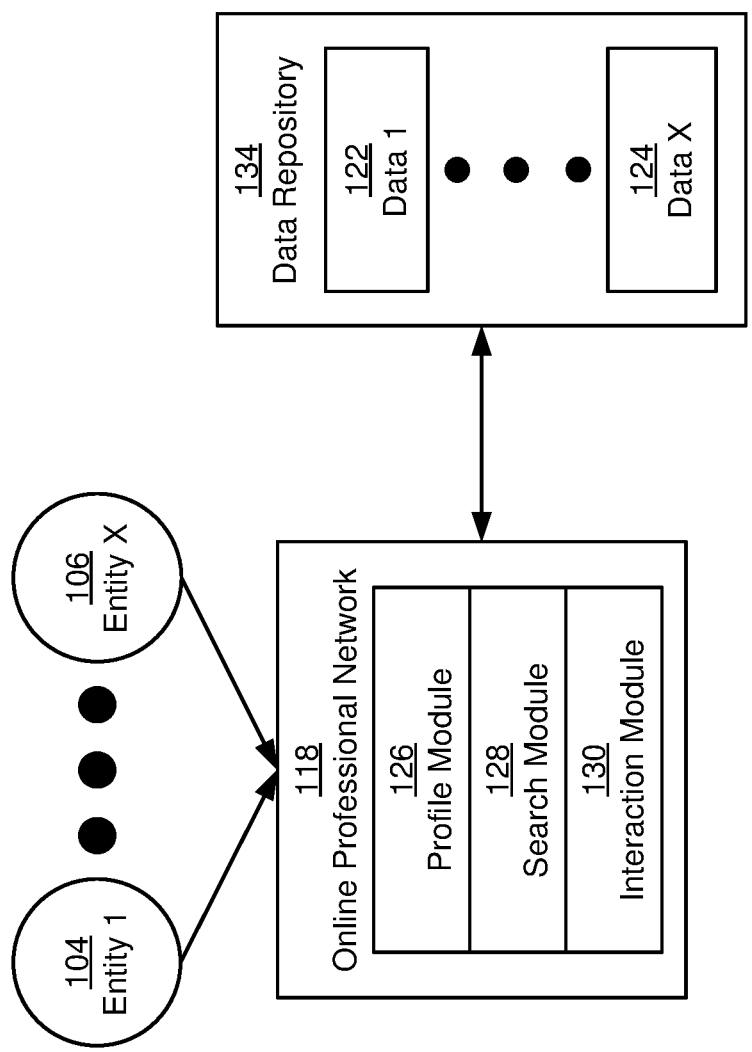
FIG. 1 shows a schematic of a system in accordance with the disclosed embodiments.

The disclosed embodiments provide a method, apparatus, and system for processing data. More specifically, the disclosed embodiments provide a method, apparatus, and system for selecting content for inclusion in a content feed of a social network. As shown in FIG. 1, the social network data may be associated with an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. Profile module 126 may also allow the entities to view the profiles of other entities in online professional network 118.

Next, the entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on online professional network 118 to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, interaction module 130 may allow an entity to add other entities as connections, follow other entities, exchange messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest postings, articles, and/or updates from the entities' connections and/or groups to the entities. Similarly, online professional network 118 may include mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in online professional network 118 may be tracked and stored in a database, data warehouse, cloud storage, and/or other data-storage mechanism providing data repository 134.

Figure 2:
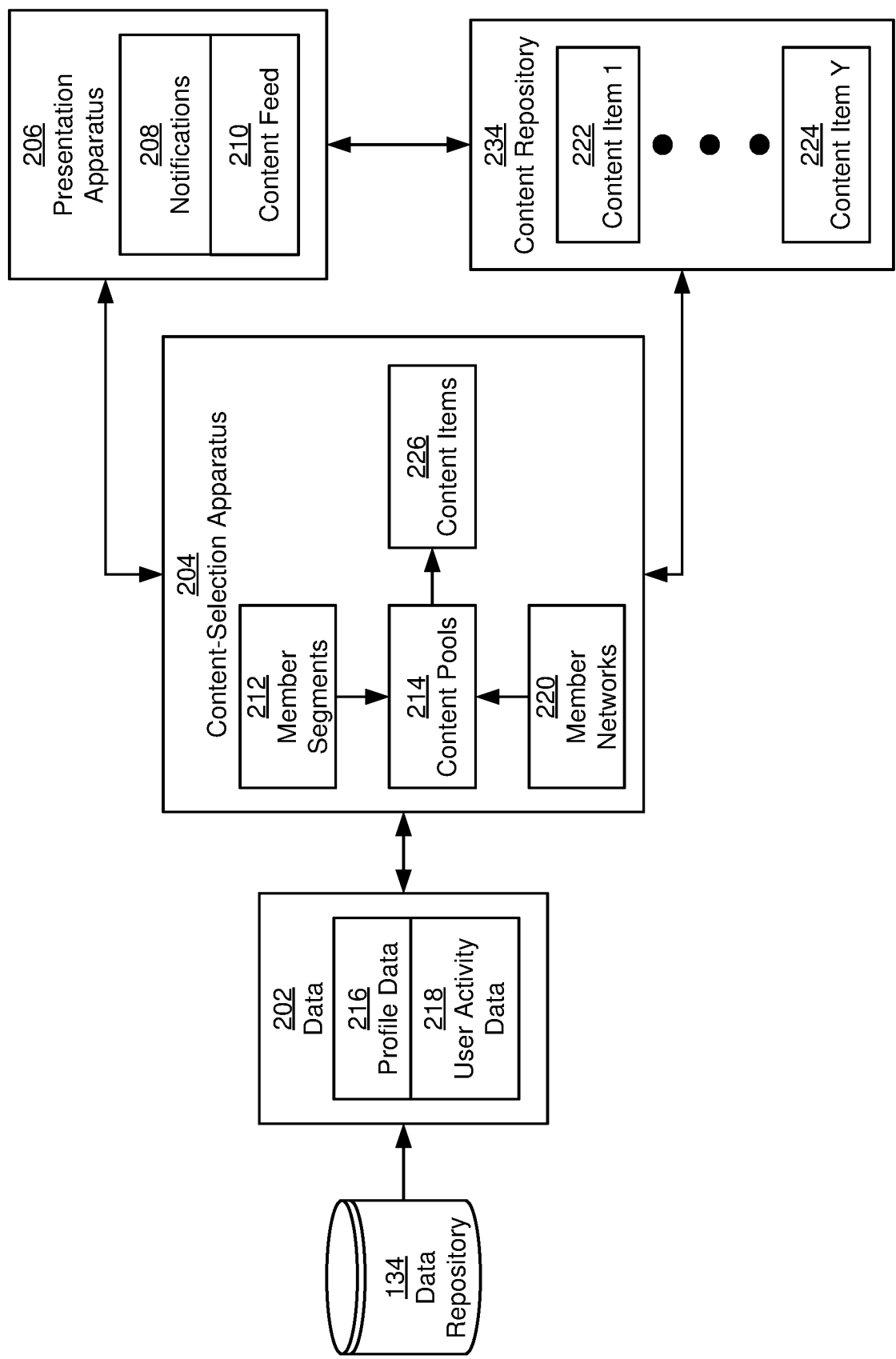
FIG. 2 shows a system for processing data in accordance with the disclosed embodiments.

As shown in FIG. 2, data repository 134 and/or another primary data store may be queried for data 202 that includes profile data 216 for users of a social network (e.g., online professional network 118 of FIG. 1), as well as user activity data 218 that tracks the users' activity within and/or outside the social network. Profile data 216 may include data associated with user profiles in the social network. For example, profile data 216 for an online professional network may include a set of attributes for each user, such as demographic (e.g., gender, age range, nationality, location), professional (e.g., job title, employer, industry, experience, skills, seniority level, professional endorsements), social (e.g., organizations of which the user is a member, geographic area of residence), and/or educational (e.g., degree, university attended, certifications) attributes. Profile data 216 may also include a set of groups to which the user belongs, the user's contacts and/or connections, and/or other data related to the user's background, personal attributes, and/or professional attributes.

User activity data 218 may include records of user interaction with a set of content items (e.g., content item 1 222, content item y 224) associated with the social network. For example, user activity data 218 may be used to track impressions, clicks, likes, dislikes, shares, hides, comments, posts, updates, conversions, and/or other user activity associated with the content items. User activity data 218 may also track other types of activity on the social network, including connections, messages, and/or interaction with groups or events.

The content items may include user profiles, job postings, user posts, status updates, advertisements, articles, images, audio, video, documents, and/or other types of content that can be accessed within or through the social network. Representations of the content items may be stored in a content repository 234 for subsequent retrieval and use. For example, content repository 234 may include an identifier, location (e.g., Uniform Resource Locator (URL)), metadata, and/or content for each content item that is created, posted, featured, and/or shared using the online professional network.

In one or more embodiments, profile data 216 and user activity data 218 are used to generate and customize content feeds (e.g., content feed 210) of content items for users of the social network. For example, a website and/or mobile application associated with the social network may include a "news feed" of the latest activity and updates on the social network. To improve the user experience with the social network, content items in the news feed may be selected and/or ordered based on the behavior and/or interests of users and/or related groups of users in the social network.

More specifically, a content-selection apparatus 204 may generate a set of content pools 214 based on user activity data 218 associated with a set of member segments 212 in the social network. Member segments 212 may include sets of attributes associated with groups of users in the social network. For example, member segments 212 may be defined for different industries, job functions (e.g., groups of similar job titles), demographics, locations, companies, types of companies, schools, skills, levels of seniority, levels of reputation, levels of influence, membership groups, and/or sets of user connections in the online professional network.

In turn, a content pool for a given member segment may include a set of content items that is associated with high levels of user interaction in the member segment. For example, content items in content repository 234 may be included in a content pool for a member segment if the content items have relatively high numbers of recent shares, likes, comments, clicks, and/or impressions in the member segment. Generation of content pools for member segments of social networks is described in further detail below in a co-pending non-provisional application by inventors Timothy P. Jurka, Patrick Chase, Claire McGinty, Andrew Hatch, Alejandro Perez, Michael Conover, Sam Stokes, Gregory W. Bayer, Akshay Kothari and Ankit Gupta, entitled "Segment-Based Content Pools for Inclusion in Content Feeds," having Ser. No. 14/741,308, and filing date 16 Jun. 2015, which is incorporated herein by reference.

Content-selection apparatus 204 may also generate content pools 214 based on user activity data 218 associated with a number of member networks 220 in the social network. Illustratively, member networks 220 may include first- and second-degree networks of members in the social network. Thus, a content pool for a given member's network may include content items that have high levels of user engagement within the member's first- and/or second-degree connections, as described in further detail below with respect to FIG. 3.

Content-selection apparatus 204 may additionally include functionality to select a subset of content items 226 in content pools 214 as particularly relevant to the corresponding member segments 212 and/or member networks 220. For example, content items 226 may have disproportionately high levels of user engagement compared with other content items in the corresponding content pools. In turn, such content items may be featured, highlighted, and/or otherwise presented to members in the member segments and/or member networks to improve access to interesting or engaging content by the members, as described in further detail below with respect to FIG. 4.

Next, a presentation apparatus 206 may generate a content feed 210, from a number of content pools 214, for some or all members of the social network. For example, presentation apparatus 206 may combine content items in content pools associated with a member's network and/or one or more member segments to which the member belongs into a content feed 210 for that member. In addition, presentation apparatus 206 may order the content items into content feed 210 based on criteria such as the member's probability of clicking on each content item and/or the existing level of user engagement with the content item, as described in the above-referenced application.

Presentation apparatus 206 may additionally generate one or more notifications 208 related to content items in content pools 214 and/or content feed 210. For example, presentation apparatus 206 may generate email, push, content feed, social network, and/or other notifications or alerts related to content items that have been identified as highly relevant or engaging (e.g., content items 226) by content-selection apparatus 204. Thus, the system of FIG. 2 may improve the quality of content feed 210 and, in turn, user engagement with the content feed and the social network.

Figure 3:
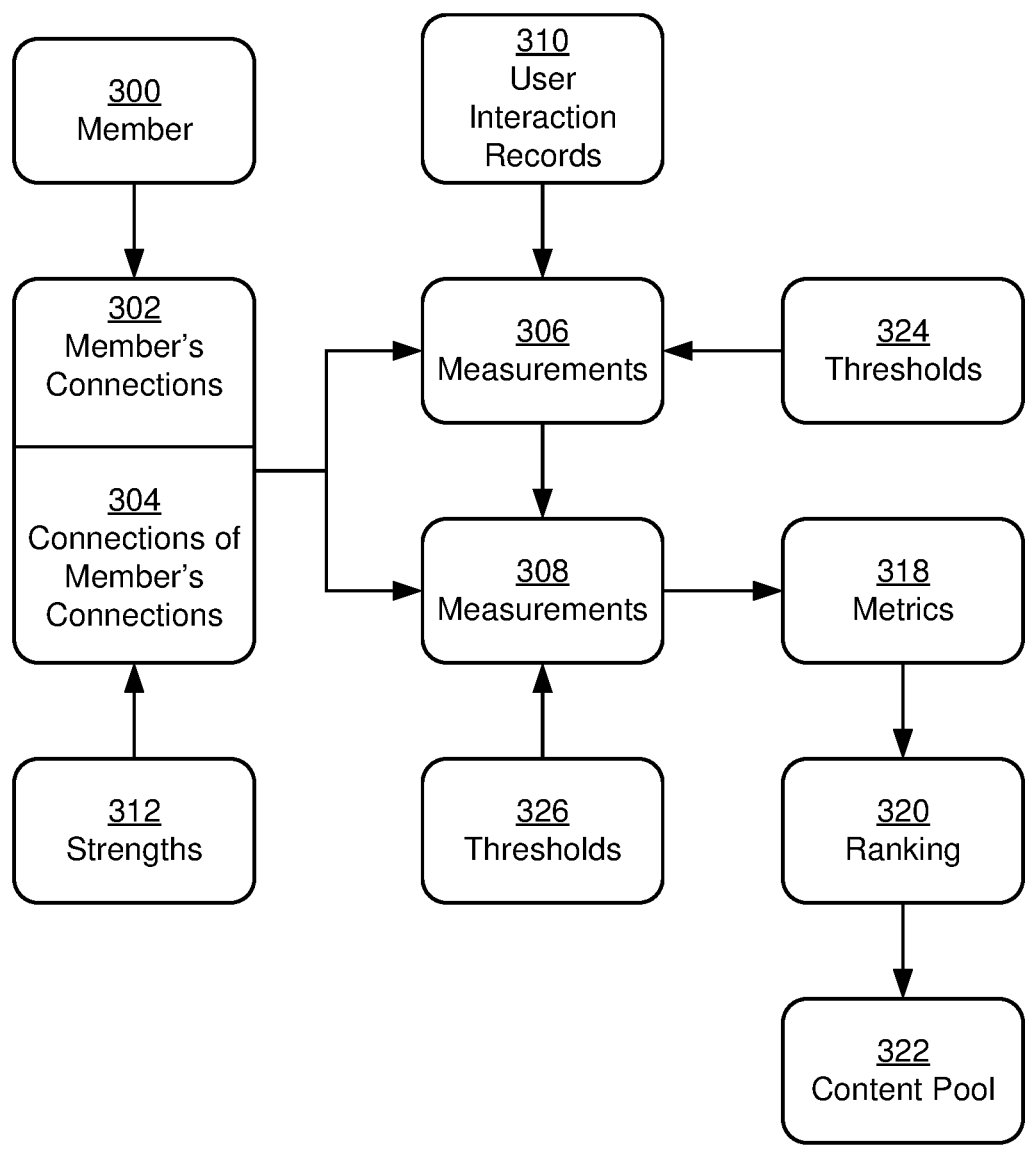
FIG. 3 shows the generation of a content pool based on expanded network engagement with content items in a social network in accordance with the disclosed embodiments.

FIG. 3 shows the generation of a content pool 322 based on expanded network engagement with content items in a social network in accordance with the disclosed embodiments. As described above, content pool 322 may be customized for a member 300 of the social network. For example, content pool 322 may be customized to contain a set of content items that are "popular" or "trending" among the member's connections 302 (i.e., the member's first-degree network) and/or connections 304 of the member's connections (i.e., the member's second-degree network). As a result, content pool 322 may contain content that is interesting to a group of interconnected members in the social network, unlike other content pools that include content that is relevant to attribute-based member segments in the social network.

As shown in FIG. 3, network engagement may be tracked using a set of user interaction records 310. Each user interaction record may include, for example, a "member ID" for a member of the social network, an "article ID" for a content item with which the member has interacted, and the type of interaction between the member and the content item. For example, a user interaction record may be generated for each click, impression, upvote, downvote, like, dislike, share, and/or other type of interaction with a content item in a content feed of the social network, such as content feed 210 of FIG. 2.

In addition, user interaction records 310 may be combined with a set of connections 302 of a member 300 of the social network to obtain a set of measurements 306 of user engagement with content items in the first-degree network of the member. Connections 302 may include friends, family members, classmates, professional connections, and/or other members of the social network to which member 300 is directly connected. For example, each connection may be represented by a "source" field and a "destination" field, with the source field set to an identifier for member 300 and the destination field set to an identifier for another member to which member 300 is connected.

Connections 302 may also be filtered by a set of strengths 312 prior to combining user interaction records 310 with the connections. Continuing with the above example, each connection may be associated with a numeric strength score representing how well the two members know each other. In turn, connections 302 may be filtered to remove a subset of the connections with strength scores that do not meet a threshold and/or to reduce the number of connections to a pre-specified number (e.g., the strongest 1000 connections). By filtering connections 302 by strength, processing associated with generating content pool 322 may be reduced to a manageable level for members with large numbers of connections.

In one or more embodiments, measurements 306 are produced by joining connections 302 and user interaction records 310. As previously mentioned, user interaction records 310 may identify clicks and impressions of specific content items by specific members. The member and article IDs in the user interaction records may be joined with the "destination" fields in filtered connections 302 to generate a "count" of impressions and clicks of the content items among the filtered connections. The joined records may then be aggregated by the "source" field in connections 302 and article IDs from user interaction records 310 to obtain measurements 306 as the total number of clicks and impressions for each content item engaged with by the filtered connections. Measurements 306 may also be produced for user engagement with the content items over a pre-specified period (e.g., the previous week) by limiting the user interaction records in the join to those that fall within the period.

Moreover, strengths 312 of the filtered connections may be used to weight the impressions and clicks in user interaction records 310, so that an impression or click from a stronger connection is given a higher "vote" in measurements 306 than an impression or click from a weaker connection. For example, each user interaction record may contain a Boolean value for a click, impression, or other type of user interaction, with the Boolean value set to 1 when the user interaction has occurred and the Boolean value set to 0 when the user interaction has not occurred. The Boolean value may be multiplied by a connection strength that ranges from 0 to 1 to obtain a weighted value of the interaction for the corresponding connection of member 300.

In turn, measurements 306 may be combined with connections 302 to aggregate an additional set of measurements 308 of user engagement with the content items in the second-degree network of member 300. More specifically, measurements 306 of first-degree user engagement with the content items may be generated for all members of the social network and joined with connections 302 to transitively produce measurements 308 of user engagement in the member's second-degree network.

For example, measurements 306 may include a set of records, with each record specifying a member ID of a member, an article ID of a content item, a number of clicks of the content item in the member's first-degree network, and a number of impressions of the content item in the member's first-degree network. The "destination" fields in connections 302, which may or may not be filtered by strengths 312, may then be joined with the records to produce a list of aggregated first-degree clicks and impressions for the connections. Items in the list may then be aggregated again by the "source" field in connections 302 and article IDs from measurements 306 to obtain measurements 308 as the total number of clicks and impressions of each content item in the member's second-degree network.

Because each connection may have a single record of first-degree engagement with a given content item, the number of records in the list may be significantly smaller than the number of second-degree connections of the member and/or the set of user interaction records for the member's second-degree connections, which may further speed up processing related to generating content pool 322. Moreover, joining of aggregated first-degree clicks and impressions with individual connections 302 of member 300 may allow a click or impression from a second-degree connection to be counted as many times as the number of second-degree paths from the member to the connection. Because the connectedness of the second-degree connection may reflect the similarity of the second-degree connection to the member, an increased "vote" from well-connected members in the member's second-degree network may increase the relevance of content items in content pool 322 to the member.

One or more thresholds 324 may also be used to remove content items with low engagement from measurements 306 prior to joining with connections 302. For example, each content item in measurements 306 may be required to have a minimum number of clicks and/or impressions to be included in measurements 308.

A set of metrics 318 may then be calculated from measurements 306 and 308 to assess the level of user engagement with the content items in the first- and/or second-degree network of member 300. For example, metrics 318 may include a click-through rate (CTR) for each content item engaged with by the member's first-degree network and each content item engaged with by the member's second-degree network. If a content item is engaged with by both the first- and second-degree network, metrics 318 may include a first CTR for the content item that is calculated from clicks and impressions in the first-degree network and a second CTR for the content item that is calculated from clicks and impressions in the second-degree network.

Metrics 318 may also include a "CTR boost" that is calculated by multiplying the CTR by the logarithm of the number of clicks to produce a higher value for a content item with a larger number of clicks and a lower value for a content item with the same CTR and a smaller number of clicks. The "CTR boost" metric may thus reflect an increased "credibility" of the CTR when the content item is associated with a high number of clicks.

Metrics 318 from the member's first- and second-degree networks may additionally be combined to produce numeric scores representing the overall engagement with the content items. Continuing with the above example, a "blended score" may be calculated for each content item as a weighted combination of the content item's first- and second-degree CTR boost values. In the weighted combination, a numeric factor may be added to or multiplied by the first-degree CTR boost to increase the contribution of first-degree engagement with the content item to the blended score and reduce the effect of a higher second-degree CTR boost from a greater number of clicks in a larger second-degree network on the blended score.

A number of thresholds 324-326 may be applied to measurements 306-308 prior to generating metrics 318 from the measurements. As mentioned above, the thresholds may include a minimum number of clicks and/or impressions for each content item. If the measurements indicate that the content item does not meet the minimum thresholds, calculation of metrics 318 may be omitted for the content item.

The thresholds may also vary for content items from different content publishers. For example, a Uniform Resource Locator (URL) of the content item may be matched to a white list of trusted content publishers such as major newspapers and/or other reputable content sources. If the content item is from a content publisher on the white list, a lower minimum number of clicks and/or impressions may be applied to the content item since the content item is likely to be of higher quality. If the content item is not from a content publisher on the white list, a higher minimum number of clicks and/or impressions may be applied to ensure that the content item has sufficient user engagement before the content item is considered for inclusion in content pool 322. The URL may also be matched to a blacklist of prohibited content publishers, such as domain names that are deemed inappropriate for content pool 322. If the content item is from a content publisher on the blacklist, calculation of metrics 318 for the content item may be omitted to prevent the content item from being included in content pool 322.

After metrics 318 are calculated, a ranking 320 of the content items by metrics 318 is generated and used to generate content pool 322. For example, ranking 320 may order the content items in descending order of user engagement, as represented by metrics 318. As a result, content items at the top of ranking 320 may be associated with the highest user engagement in the first- and/or second-degree network of member 300, and content items at the bottom of the ranking may be associated with the lowest user engagement in the member's first- and/or second-degree network.

As with calculation of metrics 318, ranking 320 may be generated in a number of ways. For example, the ranking may be generated from the values of one or more metrics, a combination or weighted combination of multiple metrics, and/or an overall score for each content item.

Once ranking 320 is generated, content pool 322 may be created for member 300 based on ranking 320. For example, content pool 322 may be generated as the highest-ranked subset of content items in ranking 320. The subset may be represented by a pre-specified number of content items (e.g., the top 100 content items in ranking 320) and/or content items with metrics 318 that exceed a minimum value. The content pool may then be combined with other content pools associated with member 300 to produce the content feed for the member, as described in the above-referenced application.

Figure 4:
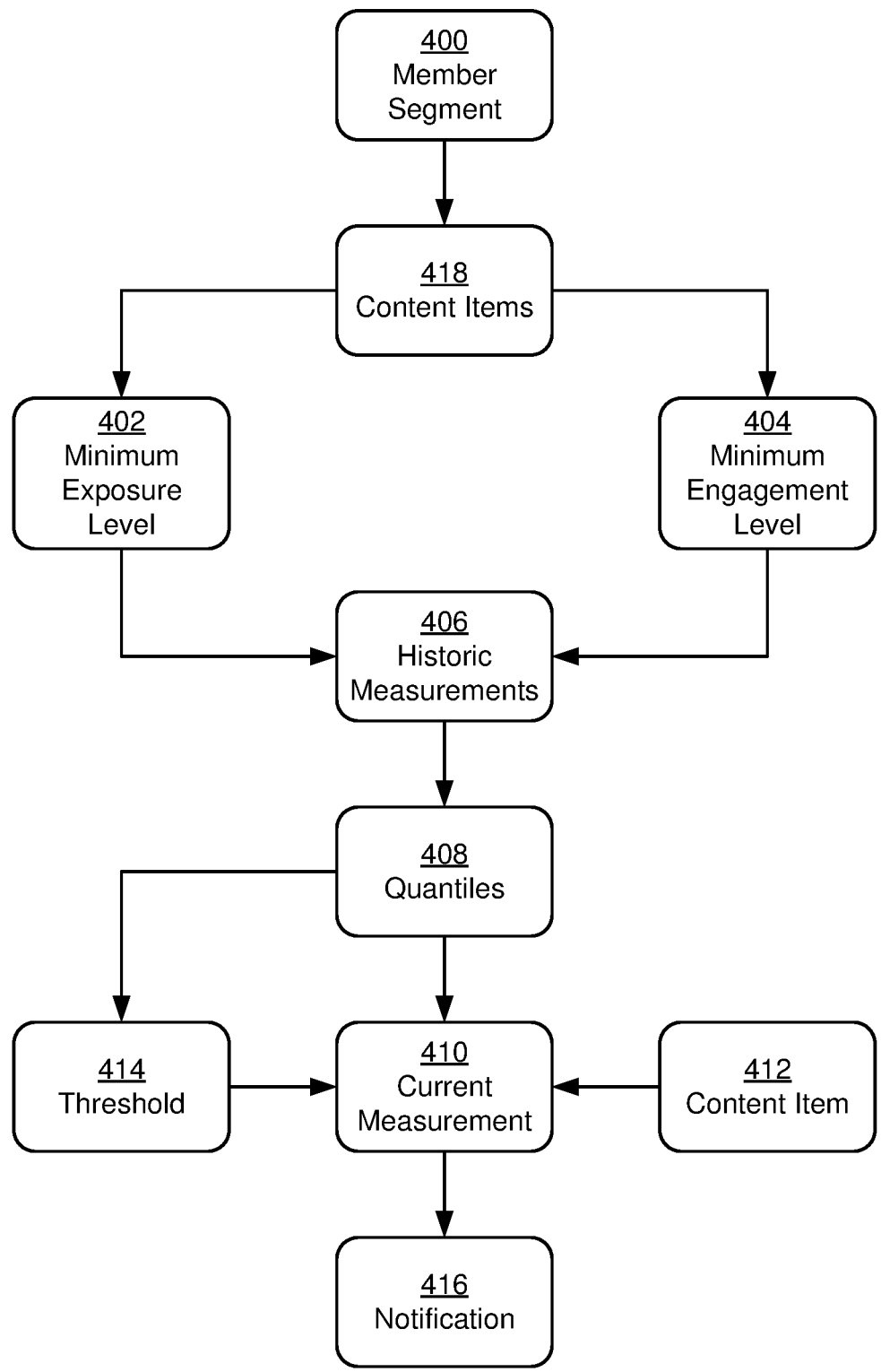
FIG. 4 shows the engagement-based selection of a content item for highlighting within a member segment of a social network in accordance with the disclosed embodiments.

FIG. 4 shows the engagement-based selection of a content item 412 for highlighting within a member segment 400 of a social network in accordance with the disclosed embodiments. For example, content item 412 may have a disproportionately high level of user engagement relative to other content items 418 in member segment 400, resulting in the flagging of content item 412 as highly relevant to member segment 400.

As shown in FIG. 4, content items 418 to which the member segment is exposed may be compared to a minimum exposure level 402 and minimum engagement level 404. Minimum exposure level 402 may include a minimum threshold for exposure to a given content item, and minimum engagement level 404 may include a minimum number of content items 418 with which the member segment has engaged. For example, minimum exposure level 402 may be set to 10 impressions per content item, and minimum engagement level 404 may be set to 1,000 distinct content items with which the member segment has engaged. If a content item does not meet minimum exposure level 402, the content item may be excluded from further analysis with respect to selecting highly relevant content in member segment 400. If content items 418 in member segment 400 do not meet minimum engagement level 404, selection of highly relevant content in the member segment may be omitted. Thus, the minimum exposure level and minimum engagement level may be used to verify a reasonable sample size of content items 418 and/or user engagement with the content items in member segment 400, which may reduce the effect of variance in small sample sizes on the analysis of user engagement with content in the member segment.

In turn, one or more content items 418 that meet minimum exposure level 402 and minimum engagement level 404 may be used to generate a set of historic measurements 406 of user engagement with content in member segment 400. Historic measurements 406 may include clicks, impressions, CTRs, boosted CTRs, and/or other metrics (e.g., metrics 318 of FIG. 3) related to interaction with individual content items by users in the member segment. Historic measurements 406 may optionally be filtered to include records of user interaction with the content items over a pre-specified period (e.g., the last two weeks, the previous year, etc.).

A set of quantiles 408 may then be produced from historic measurements 406. For example, historic measurements 406 of CTRs for individual content items 418 may be used to generate an empirical distribution of historic user engagement with content in the member segment. In turn, quantiles 408 may be obtained as pre-specified percentiles (e.g., $95^{th}$ percentile, $99^{th}$ percentile) in the distribution.

One or more of the quantiles may also be used as a threshold 414 that is compared to a current measurement 410 of user engagement with content item 412. For example, the $99^{th}$ percentile CTR from quantiles 408 may be used as threshold 414, which is compared to a current CTR of the content item in the member segment. If current measurement 410 does not exceed threshold 414, content item 412 is not identified as highly relevant to member segment 400. If current measurement 410 exceeds threshold 414, content item 412 is identified as highly relevant to member segment 400, and a notification 416 that highlights or features content item 412 is generated. For example, notification 416 may be a push notification, "news feed" notification, social network notification, email notification, and/or other type of notification that recommends the content item to one or more members in the member segment. In addition, notification 416 may be generated for members who have not yet been exposed to the content item, which as members who have not viewed the content item in their content feed.

Content item 412 may also be presented to members in member segment 400 in other ways, in lieu of or in addition to notification 416. For example, content item 412 may be displayed at or near the top of the members' content feeds and/or include formatting or styling that differs from that of other content items in the content feeds, thus "highlighting" the content item in the content feeds.

By customizing threshold 414 to the engagement profile of member segment 400, relevant or engaging content in the member segment may be identified more easily than with a technique that applies the same threshold of engagement to content across all member segments. Moreover, engagement-based selection of content items may be performed for other groups of members in the social network, such as second-degree networks of members in the social network.

For example, content items with disproportionately high CTRs in a member's second-degree network may be included in notifications to the member to expose the member to content that is relevant or engaging to similar members.

Figure 5:
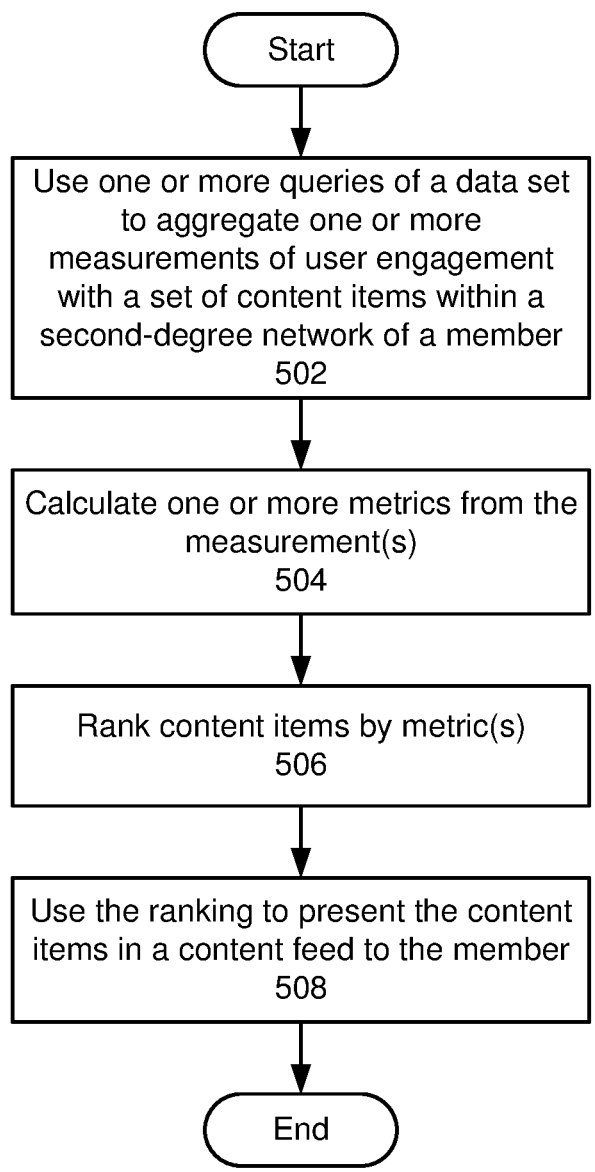
FIG. 5 shows a flowchart illustrating the processing of data in accordance with the disclosed embodiments.

FIG. 5 shows a flowchart illustrating the processing of data in accordance with the disclosed embodiments. More specifically, FIG. 5 shows a flowchart of generating a content pool based on expanded network engagement with a set of content items. In one or more embodiments, one or more of the steps may be omitted, repeated, and/or performed in a different order. Accordingly, the specific arrangement of steps shown in FIG. 5 should not be construed as limiting the scope of the embodiments.

Initially, one or more queries of a data set are used to aggregate one or more measurements of user engagement with the set of content items within a second-degree network of a member (operation 502), as described in further detail below with respect to FIG. 6. For example, the queries may be used to aggregate impressions, clicks, and/or other types of interaction with the content items among the member's first-degree connections and/or second-degree connections.

Next, one or more metrics are calculated from the measurement(s) (operation 504). For example, the metrics may include a CTR, a boosted CTR, and/or a weighted combination of first-degree engagement and second-degree engagement with a content item. The measurement(s) may be weighted and/or filtered by the strength of the member's connections and/or other thresholds (e.g., minimum number of clicks, minimum number of impressions) prior to calculating the metrics. The content items are then ranked by the metric(s) (operation 506). For example, the content items may be ranked in descending order of user engagement, as represented by one or more of the calculated metric(s).

Finally, the ranking is used to present the content items in a content feed to the member (operation 508). For example, a subset of highly ranked content items may be obtained from the ranking and included in a content pool for the member's second-degree network. The content pool may then be combined with other content pools associated with the member to generate the content feed.

Figure 6:
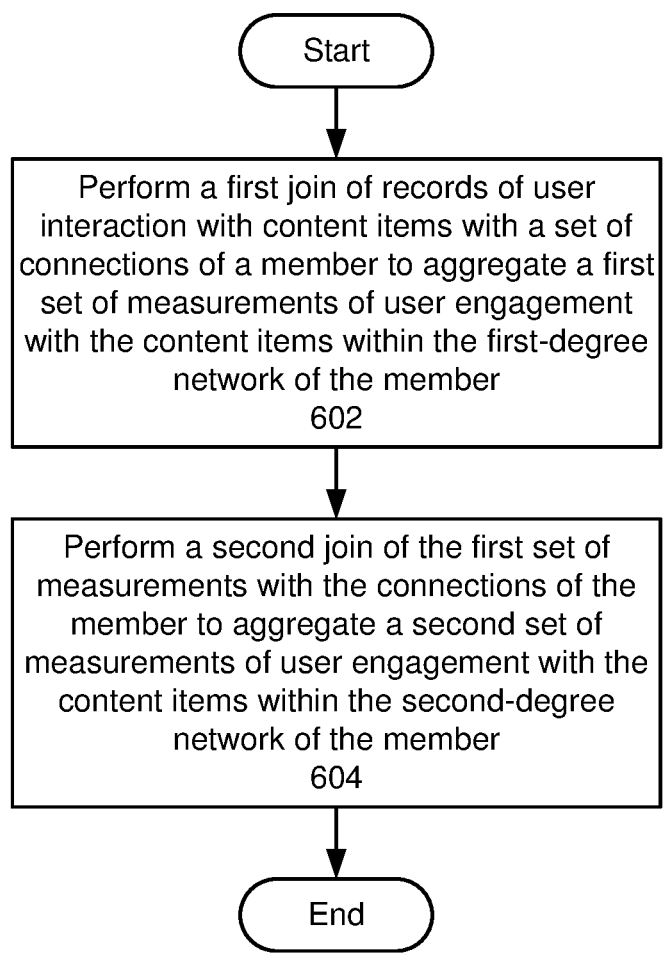
FIG. 6 shows a flowchart illustrating the process of using queries of a data set to aggregate measurements of user engagement with a set of content items within a second-degree network of a member in accordance with the disclosed embodiments.

FIG. 6 shows a flowchart illustrating the process of using queries of a data set to aggregate measurements of user engagement with a set of content items, within a second-degree network of a member, in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

Initially, a first join is performed of records of user interaction with content items with a set of connections of a member, to aggregate a first set of measurements of user engagement with the content items within the first-degree network of the member (operation 602). For example, each of the member's connections in a social network may be specified by a "source" representing the member and a "destination" representing another member to which the member is connected. Each record of user interaction may identify a member, a content item, and the type of interaction (e.g., click or impression) between the member and content item. As a result, the connections may be joined with the records of user interaction to produce, for the member, a total number of impressions and clicks of content items in the member's first-degree network.

Next, a second join is performed of the first set of measurements with the member's connections, to aggregate a second set of measurements of user engagement with the content items within the second-degree network of the member (operation 604). Continuing with the above example, the aggregated first-degree engagement with content items may be generated for each member of the social network and joined with the member's connections to produce a list of first-degree user engagement with the content items for the member's first-degree connections. Measurements in the list may then be aggregated by identifiers for the content items to obtain a total number of impressions and clicks of individual content items within the member's second-degree network. The total numbers of impressions and clicks in the member's first- and second-degree networks may then be used to calculate metrics associated with the content items and produce a content pool from the content items, as discussed above.

Aggregation of the measurements may also include filtering the data used to perform the joins. For example, the first and second joins may be filtered by the strengths of the first-degree connections to limit the overall number of connections used to produce the measurements, and in turn, reduce the processing overhead associated with performing the joins. In another example, one or more thresholds may be applied to the first set of measurements prior to performing the second join to omit content items with low user engagement from one or both sets of measurements.

Figure 7:
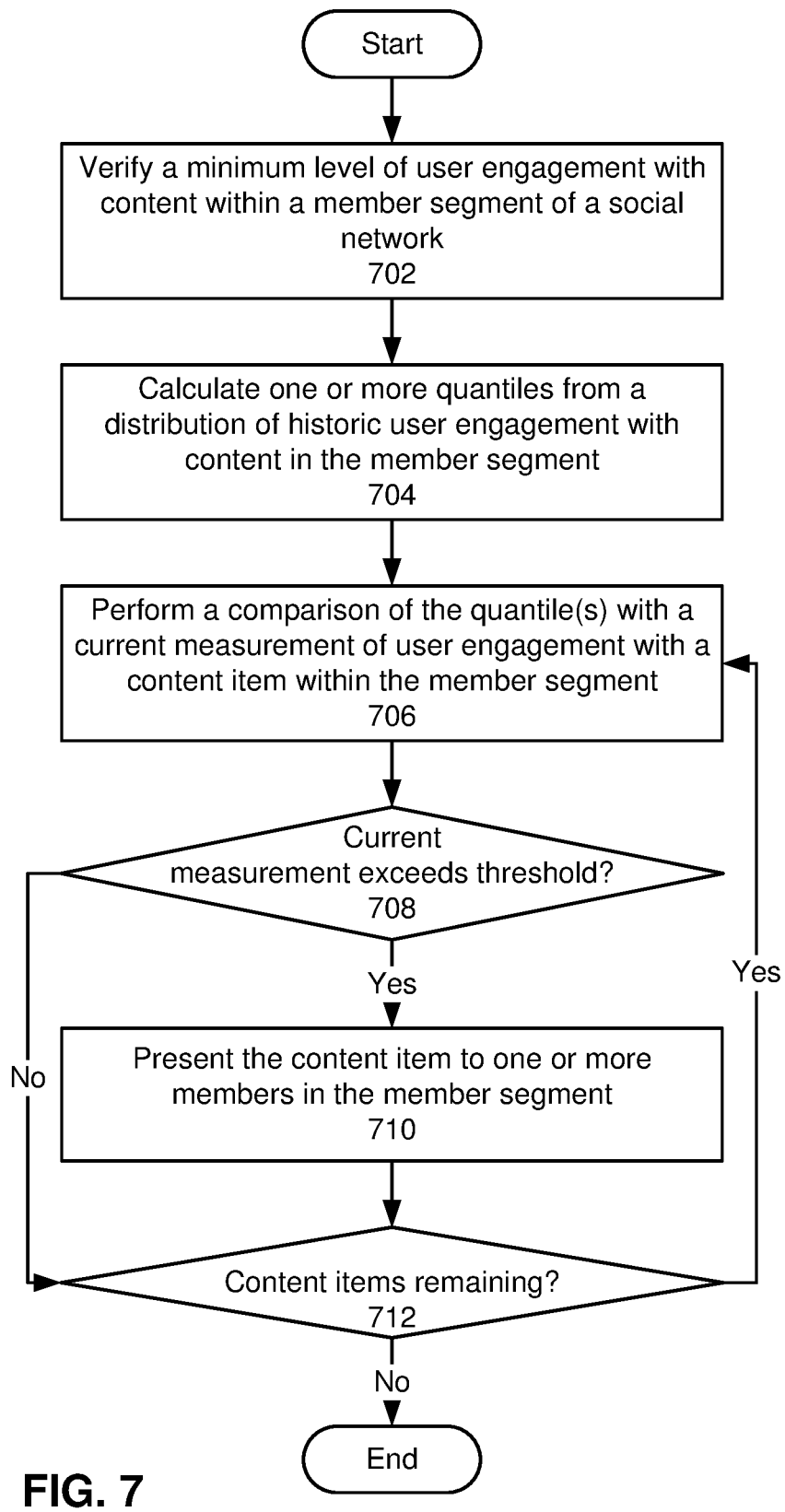
FIG. 7 shows a flowchart illustrating the processing of data in accordance with the disclosed embodiments.

FIG. 7 shows a flowchart illustrating the processing of data in accordance with the disclosed embodiments. More specifically, FIG. 7 shows a flowchart of identifying content items for highlighting within a member segment of a social network. In one or more embodiments, one or more of the steps may be omitted, repeated, and/or performed in a different order. Accordingly, the specific arrangement of steps shown in FIG. 7 should not be construed as limiting the scope of the embodiments.

First, a minimum level of user engagement with content within the member segment is verified (operation 702). For example, the minimum level of user engagement may specify a minimum number of content items with which the member segment has interacted over a pre-specified period (e.g., two weeks, one month, one year, etc.). If the member segment does not meet the minimum level of user engagement, highlighting of content items in the member segment may be omitted.

If the member segment meets the minimum level of user engagement, one or more quantiles are calculated from a distribution of historic user engagement with content in the member segment (operation 704). For example, the quantile(s) may be calculated from a set of historic measurements of user engagement with content in the member segment, such as records of clicks and impressions of content items by members in the member segment. One or more historic measurements may be omitted from the set when the exposure of the member segment to one or more content items associated with the historic measurement(s) does not meet a minimum exposure level. For example, content items that do not meet a minimum number of impressions and/or clicks may be omitted from a set of historic CTRs for the member segment. After the historic measurement(s) are omitted from the set, the quantile(s) may be calculated from the remainder of the historic measurements.

A comparison of the quantile(s) with a current measurement of user engagement with a content item within the member segment is then performed (operation 706) to determine if the current measurement exceeds a threshold (operation 708). For example, the $99^{th}$ percentile CTR for the member segment may be used as a threshold for the current CTR of the content item in the member segment. When the current measurement does not exceed the threshold, the content item is not identified as highly relevant or engaging to the member segment.

When the current measurement exceeds the threshold, the content item is presented to one or more members in the member segment (operation 710). For example, a notification of the content item may be outputted to the member(s), the content item may be placed at the top of a content feed for the member(s), and/or the appearance of the content item may be modified to emphasize the content item to the member(s). The member(s) may also be selected for presentation of the content item based on a lack of prior exposure to the content item (e.g., in a content feed of the social network).

The comparison may be repeated for remaining content items (operation 712) with which the member segment has engaged. For example, operation 706 may be repeated for content items that meet the minimum exposure level for the member segment. When a current measurement of user engagement with a given content item exceeds the corresponding threshold from the quantile(s), the content item is presented to one or more members in the member segment (operation 710), such as members who have not been exposed to the content item. In turn, the presented content item(s) may improve access to content that is highly relevant to the member segment by the member(s).

Figure 8:
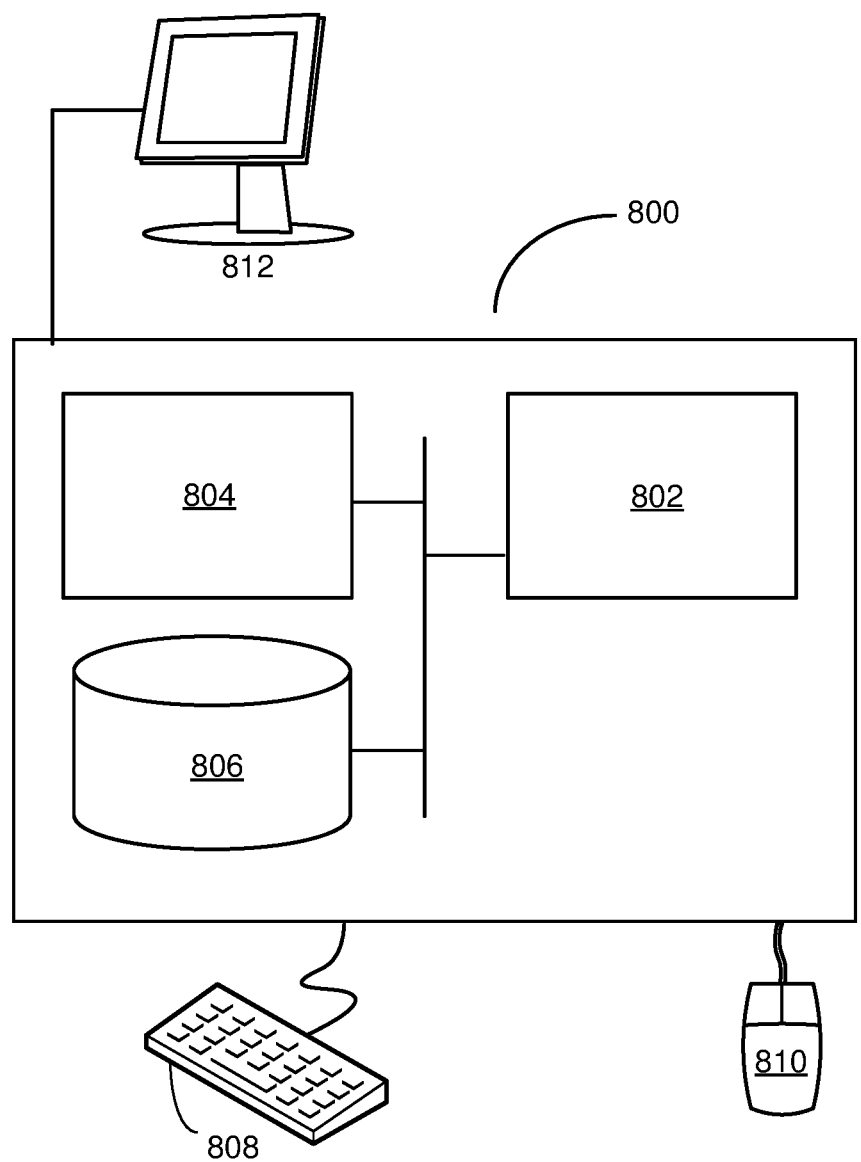
FIG. 8 shows a computer system in accordance with the disclosed embodiments.

FIG. 8 shows a computer system 800 in accordance with an embodiment. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for processing data. The system may include a content-selection apparatus and a presentation apparatus. The content-selection apparatus may use one or more queries of a data set to aggregate one or more measurements of user engagement with a set of content items, within a second-degree network of a member. Next, the content-selection apparatus may calculate one or more metrics from the measurement(s). The content-selection apparatus may also rank the set of content items by the one or more metrics, and the presentation apparatus may use the ranking to present the set of content items in a content feed to the member.

The content-selection apparatus may additionally calculate one or more quantiles from a distribution of historic user engagement with content in a member segment of a social network. Next, the content-selection apparatus may perform a comparison of the one or more quantiles with a current measurement of user engagement with a content item in the member segment. When the comparison indicates that the current measurement of user engagement exceeds a threshold, the presentation apparatus may present the content item to one or more members in the member segment.

In addition, one or more components of computer system 800 may be remotely located and connected to the other components over a network. Portions of the present embodiments (e.g., content-selection apparatus, presentation apparatus, data repository, content repository, etc.) may also be located on different nodes of a distributed system that implements the embodiments. For example, the present embodiments may be implemented using a cloud computing system that generates a set of content pools and/or content feeds for a set of remote members of a social network and presents the content pools, selected content items in the content pools, and/or content feeds to the members.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    calculating, by a computer system, one or more quantiles from a distribution of historic user engagement with content within a member segment of a social network;
    performing, by the computer system, a comparison of the one or more quantiles with a current measurement of user engagement with a content item within the member segment; and
    when the comparison indicates that the current measurement of user engagement exceeds a threshold:
        selecting one or more members in the member segment for presentation of the content item, based on a lack of prior exposure to the content item;
        modifying an appearance of the content item to emphasize the content item; and
        presenting the content item with the modified appearance to the one or more members;
    wherein calculating the one or more quantiles from the distribution of historic user engagement with content within the member segment comprises:
        calculating the one or more quantiles from a set of historic measurements of user engagement with content within the member segment; and
        omitting one or more historic measurements from the set of historic measurements when an exposure of the member segment to one or more content items associated with the one or more historic measurements does not meet a minimum exposure level.

2. The method of claim 1, wherein the minimum exposure level comprises a minimum number of impressions.

3. The method of claim 1, further comprising:
    verifying a minimum level of user engagement with content within the member segment prior to performing the comparison.

4. The method of claim 1, wherein the threshold comprises a value from the one or more quantiles.

5. The method of claim 1, wherein presenting the content item to the one or more members in the member segment comprises:
    outputting a notification of the content item to the one or more members.

6. The method of claim 1, wherein the current measurement of user engagement comprises a click-through rate (CTR) for the content item.

7. The method of claim 1, wherein the member segment is associated with at least one of:
    an industry;
    a company;
    a company type;
    a skill;
    a decision maker;
    a publisher;
    one or more connections; and
    a job function.

8. The method of claim 1, wherein the threshold is customized based on an engagement profile of the member segment.

9. The method of claim 8, wherein the customized threshold differs for each of a plurality of member segments in the social network.

10. An apparatus, comprising:
    one or more processors; and
    memory storing instructions that, when executed by the one or more processors, cause the apparatus to:
        calculate one or more quantiles from a distribution of historic user engagement with content within a member segment of a social network;
        perform a comparison of the one or more quantiles with a current measurement of user engagement with a content item within the member segment; and
        when the comparison indicates that the current measurement of user engagement exceeds a threshold:
            select one or more members for presentation of the content item based on a lack of prior exposure to the content item;
            modify an appearance of the content item to emphasize the content item; and
            present the content item with the modified appearance to the one or more members;
    wherein calculating the one or more quantiles from the distribution of historic user engagement with content within the member segment comprises:
        calculating the one or more quantiles from a set of historic measurements of user engagement with content within the member segment; and
        omitting one or more historic measurements from the set of historic measurements when an exposure of the member segment to one or more content items associated with the one or more historic measurements does not meet a minimum exposure level.

11. The apparatus of claim 10, wherein the memory further stores instructions that, when executed by the one or more processors, cause the apparatus to:
    verify a minimum level of user engagement with content within the member segment prior to performing the comparison.

12. The apparatus of claim 10, wherein presenting the content item to the one or more members in the member segment comprises:
    outputting a notification of the content item to the one or more members.

13. The apparatus of claim 10, wherein the current measurement of user engagement comprises a click-through rate (CTR) for the content item.

14. The apparatus of claim 10, wherein the member segment is associated with at least one of:
    an industry;
    a company;
    a company type;
    a skill;
    a decision maker;

a publisher;
one or more connections; and
a job function.

15. The apparatus of claim 10, wherein the threshold is customized based on an engagement profile of the member segment.

16. The apparatus of claim 15, wherein the customized threshold differs for each of a plurality of member segments in the social network.

17. A system, comprising:
a content-selection module comprising a non-transitory computer-readable medium comprising instructions that, when executed, cause the system to:
calculate one or more quantiles from a distribution of historic user engagement with content within a member segment of a social network; and
perform a comparison of the one or more quantiles with a current measurement of user engagement with a content item within the member segment; and
a presentation module comprising a non-transitory computer-readable medium comprising instructions that, when executed, cause the system to, when the comparison indicates that the current measurement of user engagement exceeds a threshold:
select one or more members in the member segment for presentation of the content item, based on a lack of prior exposure to the content item;
modify an appearance of the content item to emphasize the content item; and
present the content item with the modified appearance to the one or more members;
wherein calculating the one or more quantiles from the distribution of historic user engagement with content within the member segment comprises:
calculating the one or more quantiles from a set of historic measurements of user engagement with content within the member segment; and
omitting one or more historic measurements from the set of historic measurements when an exposure of the member segment to one or more content items associated with the one or more historic measurements does not meet a minimum exposure level.

18. The system of claim 17, wherein the threshold is customized based on an engagement profile of the member segment.

19. The system of claim 18, wherein the customized threshold differs for each of a plurality of member segments in the social network.

* * * * *